(12) United States Patent
Ellis

(10) Patent No.: US 6,766,526 B1
(45) Date of Patent: Jul. 20, 2004

(54) SMART CHANNEL ENTRY SYSTEM

(75) Inventor: Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/454,315

(22) Filed: Dec. 3, 1999

Related U.S. Application Data

(60) Provisional application No. 60/110,988, filed on Dec. 3, 1998.

(51) Int. Cl.[7] ............................. H04N 5/445; H04N 5/50
(52) U.S. Cl. ............................. 725/57; 725/37; 725/38; 725/39; 725/40; 725/51; 725/52; 725/54; 725/56; 725/61; 348/569
(58) Field of Search ............................. 725/38, 56, 57, 725/52, 37, 39, 61, 54, 51, 40; 348/569

(56) References Cited

U.S. PATENT DOCUMENTS

| | | | | |
|---|---|---|---|---|
| 4,706,121 A | | 11/1987 | Young ........................ 358/142 |
| 4,725,888 A | * | 2/1988 | Hakamada .................. 358/183 |
| 4,959,720 A | | 9/1990 | Duffield et al. .......... 358/191.1 |
| 5,068,734 A | | 11/1991 | Beery ...................... 358/191.1 |
| 5,191,423 A | * | 3/1993 | Yoshida .................... 358/191.1 |
| 5,315,392 A | * | 5/1994 | Ishikawa et al. ............ 348/570 |
| 5,317,403 A | * | 5/1994 | Keenan ........................ 725/38 |
| 5,416,508 A | * | 5/1995 | Sakuma et al. ................ 348/3 |
| 5,428,400 A | * | 6/1995 | Landis et al. ............... 348/569 |
| 5,477,262 A | * | 12/1995 | Banker et al. ................ 725/38 |
| 5,497,185 A | * | 3/1996 | Dufresne et al. ............. 348/2 |
| 5,512,955 A | * | 4/1996 | Toyoshima et al. ......... 348/569 |
| 5,550,576 A | | 8/1996 | Klosterman .................. 348/6 |
| 5,589,892 A | | 12/1996 | Knee et al. ................. 348/731 |
| 5,629,733 A | | 5/1997 | Youman et al. ................ 348/7 |
| 5,652,628 A | * | 7/1997 | Toyoshima et al. ......... 348/569 |
| 5,699,106 A | * | 12/1997 | Matsubara et al. ........... 348/13 |
| 5,818,541 A | * | 10/1998 | Matsuura et al. ........... 348/565 |
| 5,828,945 A | | 10/1998 | Klosterman .................. 455/4.2 |
| 5,844,633 A | * | 12/1998 | Kim .......................... 348/731 |
| 6,130,726 A | * | 10/2000 | Darbee et al. ............... 348/734 |
| 6,166,778 A | * | 12/2000 | Yamamoto et al. ......... 348/569 |
| 6,388,714 B1 | * | 5/2002 | Schein et al. ............... 348/563 |

OTHER PUBLICATIONS

The Yahoo! TV Coverage website. This website is located at tv.yahoo.com (as printed from the Internet on Dec. 2, 1999).
The SET–TOP.COM Internet TV Portal website. This website is located at www.set–top.com (as printed from the Internet on Dec. 2, 1999).
The Ruel.Net Set–Top Page website. This website is located at www.ruel.net/top/box.review.remote.control.htm (as printed from the Internet on Dec. 2, 1999).
Ellis, Michael D., "Declaration of Michael D. Ellis," Jul. 31, 2003.

* cited by examiner

*Primary Examiner*—Vivek Srivastava
*Assistant Examiner*—Son P. Huynh
(74) *Attorney, Agent, or Firm*—Fish & Neave; James A. Leiz; Andrew Van Court

(57) ABSTRACT

An interactive system is provided in which information is displayed in response to the entry of the digits of a channel number. The interactive system may be implemented on a television, a computer, or a radio system. The displayed information may be program listings information such as the channel designator or the program currently airing on the channel. The displayed information may also be a list of channels. The list of channels may be associated with the entered digits, may be component channels, or channels of the same type and may be sorted by various techniques such as numerically, by favorite channels, by type, etc. The interactive system may allow a user to specify a source identifier to channels from different sources and display the channels with the source identifier when they are entered.

44 Claims, 18 Drawing Sheets

SMART CHANNEL ENTRY SYSTEM

This application claims the benefit of U.S. provisional application No. 60/110,988, filed Dec. 3, 1998.

BACKGROUND OF THE INVENTION

This invention relates to interactive channel number entry systems. More particularly, this invention relates to interactive television channel number entry wherein after each digit is entered, information associated with the entered channel or information to assist the user in channel entry is displayed.

Cable, satellite, and broadcast television systems are increasingly providing more television channels to viewers. Viewers have traditionally been able to remember the channel numbers of their favorite channels. However, as more channels become available, this is not always possible. Users may only remember the approximate location for a desired channel number.

Television systems have recently been released that use component services. In such systems, there may be several related component channels in a digital multiplex. There is currently no convenient system that allows a user to easily tune to such component services and channels.

Program guides implemented on set-top boxes are available that allow a user to enter a channel number with a remote control. Shortly after the channel number has been entered, the program guide tunes the set-top box to the entered channel and automatically displays an overlay bar on top of the video for that channel. The overlay bar may contain the channel number and associated program listings information such as the title of the current program for the channel and the channel's call letters. This type of program guide requires that the user remember the exact channel number to which the user desires to tune.

In an available e-mail reader application, users may search for the names of a desired e-mail recipient by typing letters into a box as a list of potential recipients is displayed. As each letter is typed into the box, the list moves to focus on the names that begin with the entered letters. This type of application does not work with channel numbers.

It is therefore an object of the invention to provide a system for facilitating channel number entry.

It is also an object of the invention to provide a system for displaying information in response to each digit entered during channel entry.

It is also an object of the invention to provide a system for displaying a list of channels during channel entry that may be associated with the entered digits.

It is also an object of the invention to notify a user when a channel number is related to component channels during channel entry and allowing the user to tune to one of the component channels.

SUMMARY OF THE INVENTION

These and other objects of the invention are accomplished in accordance with the principles of the present invention by providing an interactive channel entry system. The system may display program listings information relating to the channels that are associated with the entered digits during channel entry. The program listings information for a channel may include a channel designator (e.g., the call letters for the channel, a channel name, a network affiliation, etc.), the title of the program currently airing on the channel, or other information specific to the channel.

The system may display a list of channel numbers associated with the entered digits during channel entry. The list of channels may be sorted numerically, by type, by frequency of viewing, by recent use, by favorite channels, etc.

The system may notify a user when channels are related to the channel number of the entered digit or digits during channel entry. The related channels may be channels that are components of another channel, or channels that are from the same provider, network, or of the same type such as PPV channels, digital music channels, movie channels, broadcast channels, etc.

The system may allow a user to assign a source identifier to channel numbers from different sources. The system may display the channels from the multiple sources with their corresponding source identifier during channel entry.

The interactive channel entry system may be implemented on a television, a computer, a radio system, or other suitable platform.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
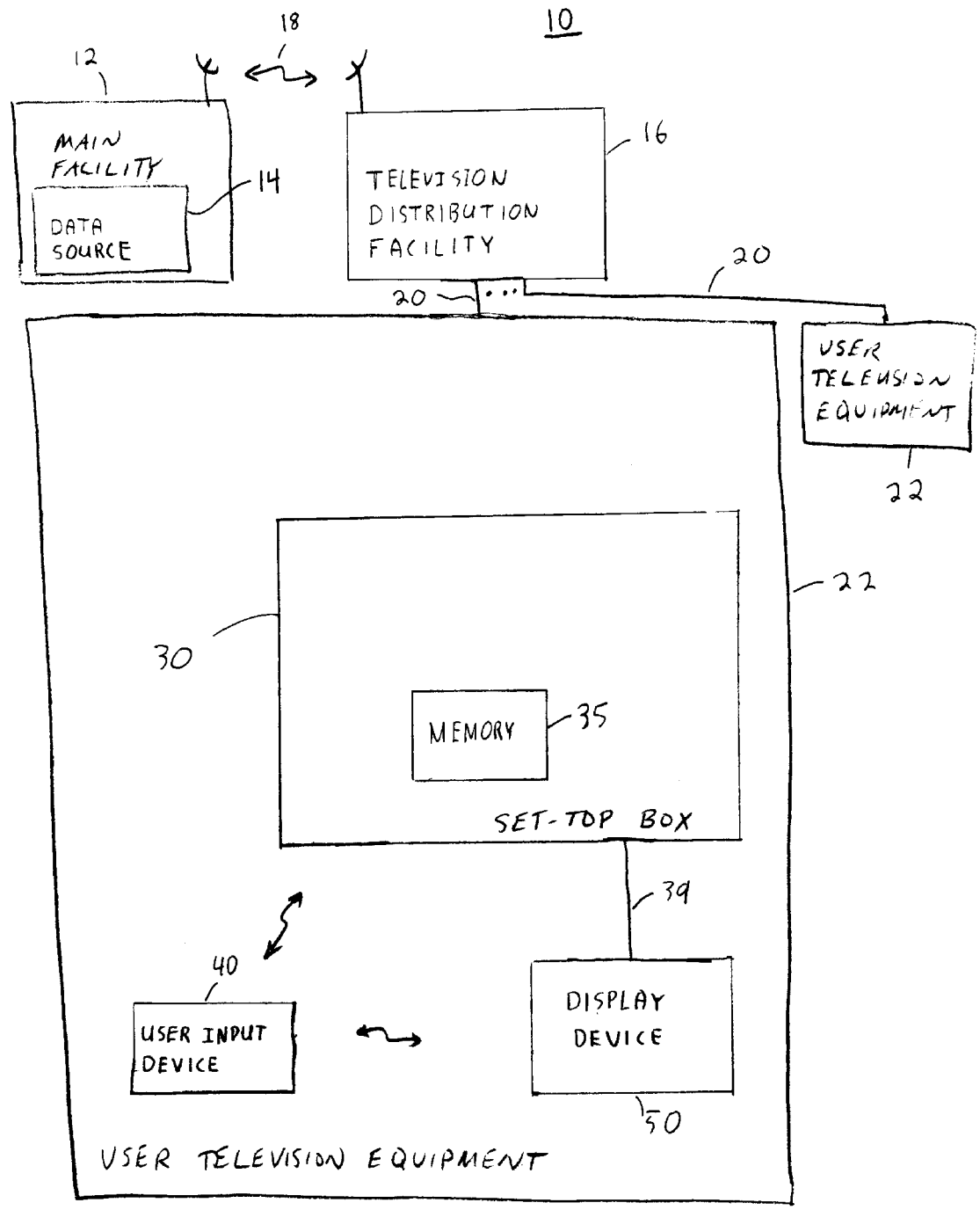
FIG. 1 is a diagram of a system in which an interactive channel entry system is implemented in accordance with the present invention.

An illustrative television system 10 in accordance with the present invention is shown in FIG. 1. Television program listings data for the current and future television programs may be stored in data source or database 14 of main facility 12. The program listings data for each program may include the title of the program, the channel of the program, a scheduled broadcast time (start time) and an ending time (or duration). Program listings data may also include the type of channel (e.g., PPV channel, digital music channel, movie channel, broadcast channel, etc.) and information on related channels (e.g., component channels, etc.). Main facility 12 may distribute the program listings data to multiple television distribution facilities 22 via communications paths such as communications path 18. Communications paths 18 may be any suitable communications paths, such as satellite links, telephone network links, cable or fiber optic links, microwave links, Internet links, or combinations of such paths. Only one television distribution facility 16 is illustrated in FIG. 1 to avoid over-complicating the drawing. For clarity, the invention will be primarily discussed in connection with the use of one such television distribution facility. Television distribution facility 16 may be, for example, a cable system headend, a broadcast distribution facility, or a satellite television distribution facility.

Each television distribution facility 16 has a number of associated users each of which has user television equipment 22 connected to television distribution facility 16 via one of communications paths 20. Communications paths 20 may be any suitable type of link suitable for supporting television programming and data. For example, if television distribution facility 16 is a cable system, communications paths 20 may be cable. Paths 20 may be used to distribute television programming to user television equipment 22. The television signals distributed to user television equipment 22 may be analog, digital or both.

Paths 20 may also be used to distribute data such as program listings data to user television equipment 22. Data may be distributed using an in-band or out-of-band technique and may use digital or analog techniques. Data may be distributed continuously, periodically, or on-demand. If desired, data may be distributed by one or more distribution facilities that are similar to television distribution facility 16 using communications paths that are separate from communications paths 20. Communications paths 20 may include, for example, a satellite link, a telephone network link, a cable or fiber optic link, a microwave link, an Internet link, a digital subscriber line (DSL) link, a combination of such links, or any other suitable communications link.

Each user has a receiver, which is typically a set-top box such as set-top box 30, but which may be other suitable equipment into which circuitry similar to set-top box circuitry has been integrated. Set-top box 30 may have memory 35. Memory 35 may be any memory or other storage device, such as random-access memory (RAM), a hard disk drive, a combination of such devices, etc., that is suitable for storing data and software instructions. Each set-top box 30 preferably contains a processor to handle tasks associated with implementing interactive channel entry functions and displaying data on display device 50.

For clarity, the present invention is described primarily in connection with user television equipment 22 based on a set-top box arrangement. This is merely illustrative. The interactive tuning features of the present invention may be implemented using user television equipment 22 that is based on a personal computer, a WebTV box, a personal computer television (PC/TV), or handheld computing device, etc. If desired, the system may be implemented using a client-server architecture using user television equipment 22 as a client processor and a computer in television distribution facility 16 as a server.

Television programming from television distribution facility 16 and display screens from set-top box 30 may be provided to display device 50 using communications path 39, which may be, for example, a cable or wire. Display device 50 may be any suitable display device such as a television or a computer monitor. The user may view television programming on display device 50 and may use display device 50 (or an auxiliary audio system) to listen to music channels or other audio programs.

Figure 2:
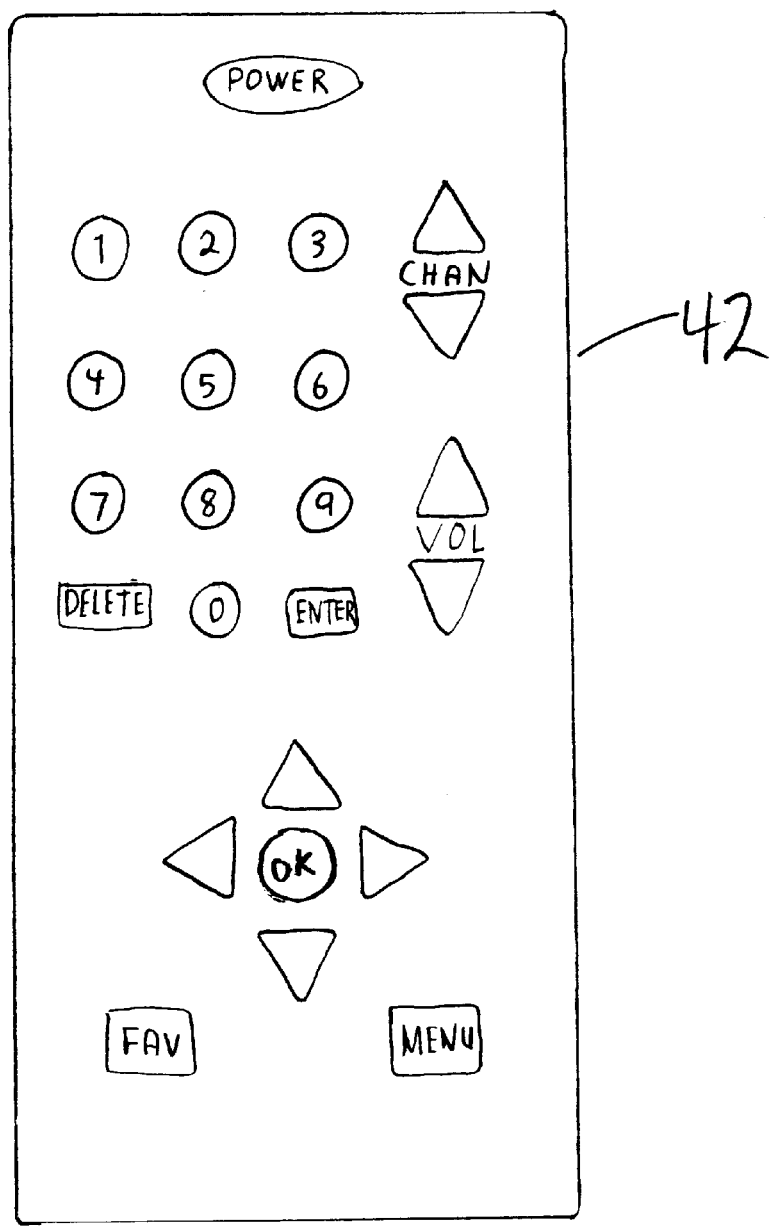
FIG. 2 depicts a remote control that can be used in accordance with the present invention.

Set-top box 30 and display device 50 may be controlled by user input device 40 or any other suitable user interface such as a remote control, mouse, trackball, wireless keypad, voice recognition system, touch pad, dedicated keys, etc. User input device 40 is shown in FIG. 2 as remote control 42.

Television viewers sometimes feel overwhelmed by the large number of programming choices available, particularly with modern cable and satellite systems. The interactive channel entry features of system 10 assist the user in entering, finding, and tuning to a desired program or channel. These features allow system 10 to display on-screen information whenever the user enters digits for a channel with remote control 42. The interactive channel entry features of system 10 may also be used to provide the user with a list of possible channels to which the user may tune.

Figure 3:
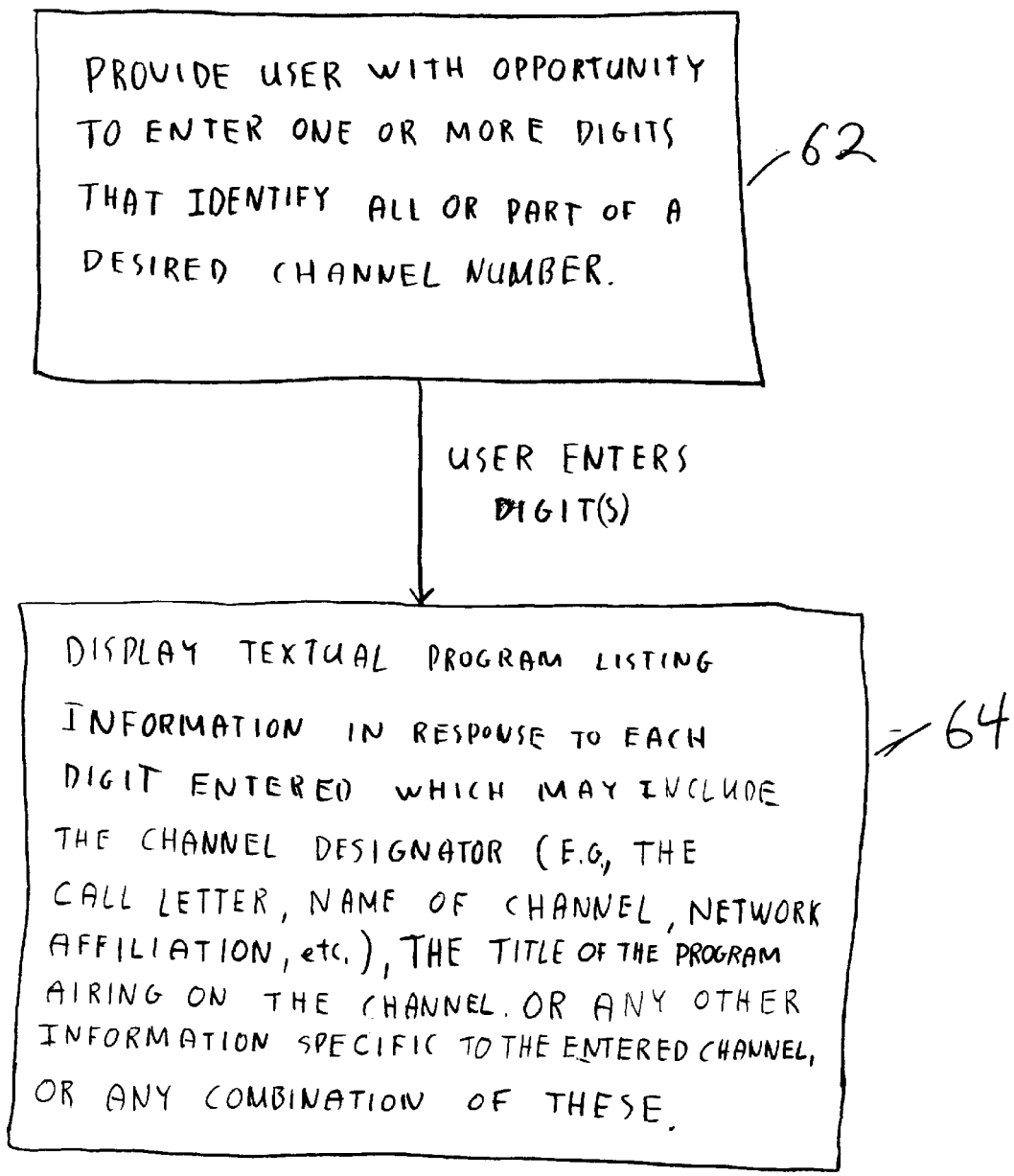
FIG. 3 is a flow chart of steps involved in providing information in response to channel number entry in accordance with the present invention.

Steps involved in using the interactive channel entry features of system 10 to display information in response to the entry of the channel number digits by the user are shown in FIG. 3. At step 62, the system may provide the user with an opportunity to enter one or more digits that identify all or part of a desired channel number. Systems with any suitable number of channels may be supported. For clarity, the system will be described in context of an arrangement in which there are 1000 channels, numbered 0–999.

At step 64, the system may display textual program listings information relating to the channel or channels that are associated with the entered digits. The program listings information that is displayed may vary in response to each additional digit entered by the user. The displayed program listings information may include the channel designator (e.g., the call letter, name of channel, network affiliation, etc.), the title of the program airing on the channel, or any other information specific to the channel.

Figure 4:
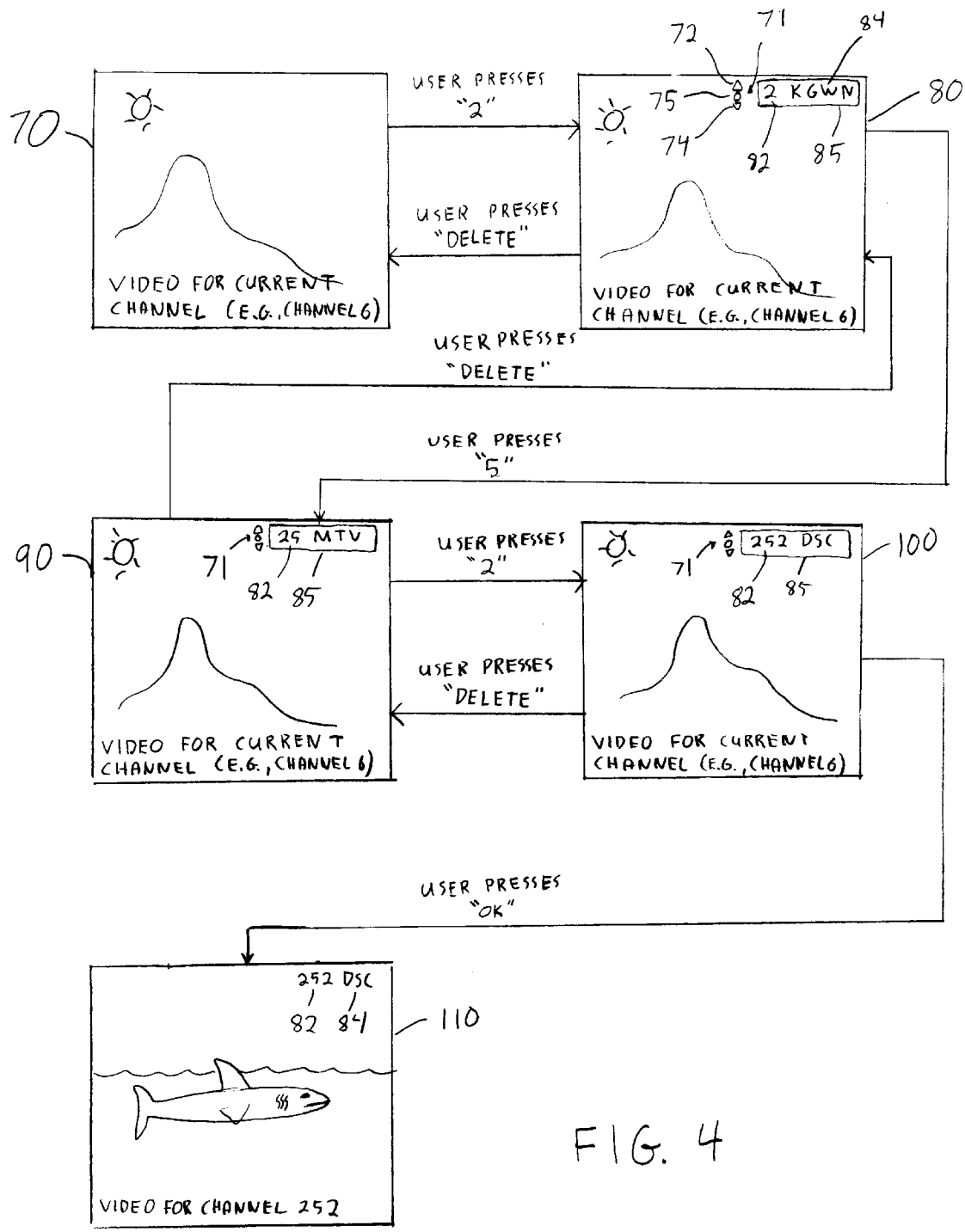
FIG. 4 is a diagram of illustrative channel number entry screens displaying program listing information in accordance with the present invention.

The appearance of the user's display device 50 during the channel entry steps of FIG. 3 is illustrated in FIG. 4. When a user is initially watching a television, screen 70 may be displayed on display device 50. If the user desires to tune directly to channel 252, the user may enter each digit of the channel number. For example, the user may initially press the "2" key on user input device 40. This may result in screen 80, in which highlight region 85 and graphic 71 are displayed as overlays on top of the program that was being displayed in screen 70. Highlight region 85 may contain a channel number 82 corresponding to the entered digit and program listings information 84 associated with the entered digit. In screen 80, the program listings information 84 is the channel designator KGWN. Graphic 71 may contain up graphic arrow 72, down graphic arrow 74 and "ENTER" or "OK" graphic 75.

The user may then press the "5" key which may result in the displaying of screen 90. Screen 90 contains graphic 71 and highlight region 85. Highlight region 85 may include channel number 82 corresponding to the entered digits "25" and its associated channel designator MTV. The user may then press the "2" key which may result in the displaying of screen 100. Screen 100 may have graphic 71 and highlight region 85. Highlight region 85 of screen 100 may include channel number 82 corresponding to the entered digits "252" and its associated channel designator DSC.

Channel 252 is the desired channel. In order to tune to this channel, the user may wait for a predetermined or a user-selectable amount of time or may press an "ENTER" or "OK" key (hereinafter referred to as the "OK" key) on user input device 40. For example, the user may press the "OK" key and the system will tune to the desired channel as shown in screen 110. Screen 110 may initially display the contents of highlight region 85 in screen 100 such as channel number 82 for the channel to which set-top box is currently tuned and its associated program listings information 84 for a certain period of time. The absence of a highlight on channel number 82 or program listings 84 in screen 110 may be useful as a signal to the user that the system has tuned to the desired channel.

When used, the highlight region 85 may be displayed as a solid highlight, a semi-transparent highlight, or an outline of a box. From any of screens 80, 90, and 100, the user may press the "DELETE" key to return to a previous screen. This effectively removes or deletes the last entered digit. For example, if screen 100 is displayed, the user may press the "DELETE" key to return to screen 90. This may be particularly useful with a large number of channels because a user is able to correct a mistake made in entering a channel number without having to re-enter the entire number. In addition, displaying the program listings information 84 for the channel may allow the user to determine whether the channel number that the user entered is correct before tuning to that channel. The screen displays in FIG. 4 are merely illustrative. Although highlight region 85 is shown as highlighting a channel designator corresponding to channel number 82, it will be understood that region 85 may contain any suitable program listings information (such as the types of program listings information described in connection with step 64 of FIG. 3).

Graphic 71 serves to notify the user that a navigation key or keys on the user input device 40 may be used to navigate through or select one of the channels available to the user. Graphic 71 in screens 80, 90, and 100 contains up arrow graphic 72, down arrow graphic 74 and an "ENTER" or "OK" graphic 75. If a user presses the up arrow on user input device 40 while on screen 90, the next higher channel number (e.g. 26) and its corresponding channel designator may be highlighted by highlight region 85. Similarly, if the user decides to press the down arrow on user input device 40 twenty-three times, the system may display screen 80 with "2" as the highlighted channel number 82. In this way, by pressing up and down arrows 72 and 74, the user may navigate numerically through the available channel numbers. If the user navigates to the number of a channel to which the user desires to tune, the user may wait for a period of time (after which the system tunes to the desired channel automatically) or may press the "OK" key on user input device 40 to tune to the desired channel.

Figure 5:
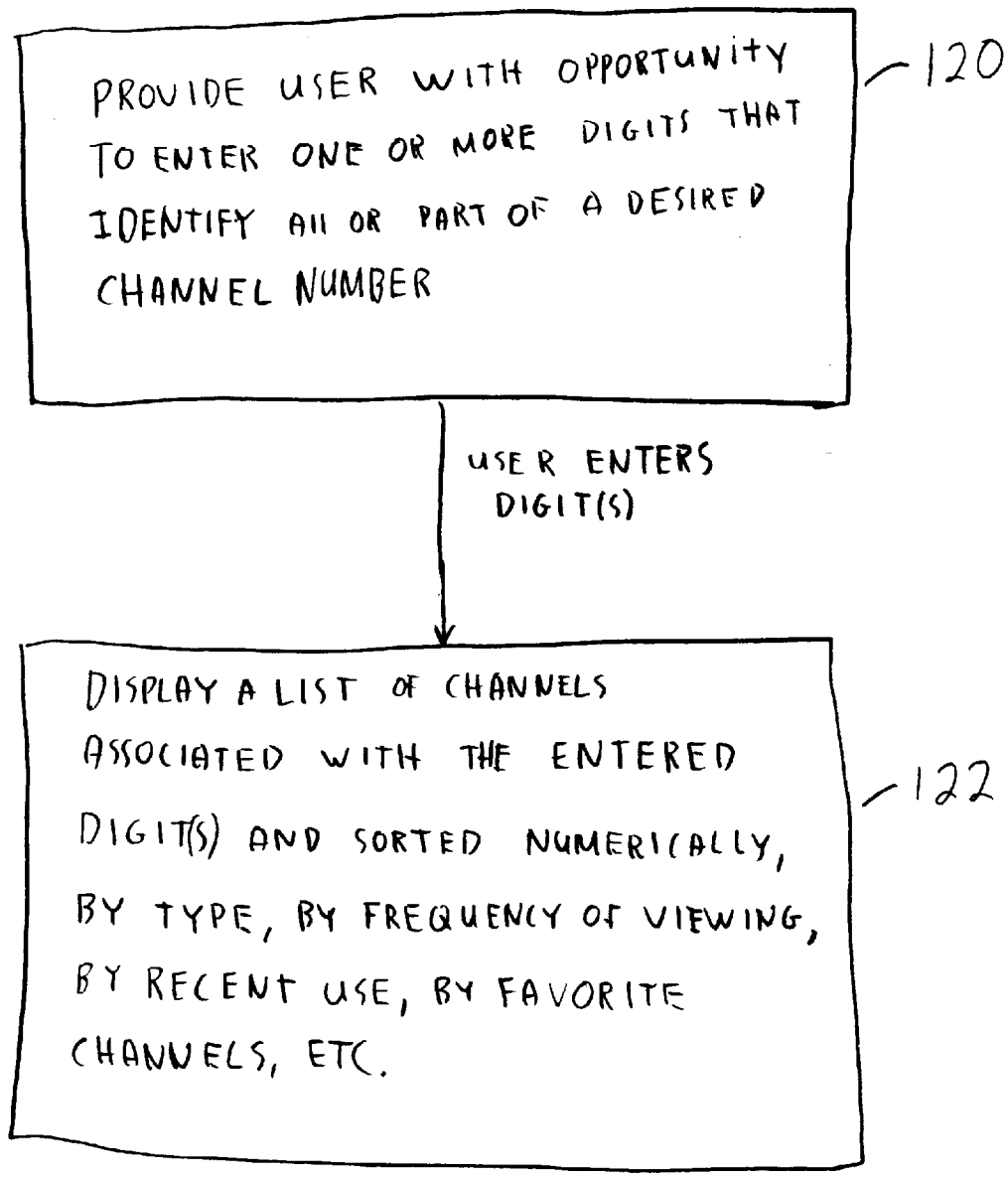
FIG. 5 is a flow chart of steps involved in providing a list of channels in response to channel number entry in accordance with the present invention.

If desired, a list of channel numbers may be displayed as the user enters digits of a channel number. FIG. 5 shows illustrative steps involved in displaying a such list of channels. At step 120, the system may provide the user with an opportunity to enter one or more digits that identify all or part of a channel number. At step 122, the system may display a list of channel numbers associated with the entered digit or digits. The channel numbers in the list may be sorted numerically, by type, by frequency of viewing, by recent use, by favorite channels, etc. The channels may also be sorted by any other suitable technique or a combination of such techniques.

Figure 6A:
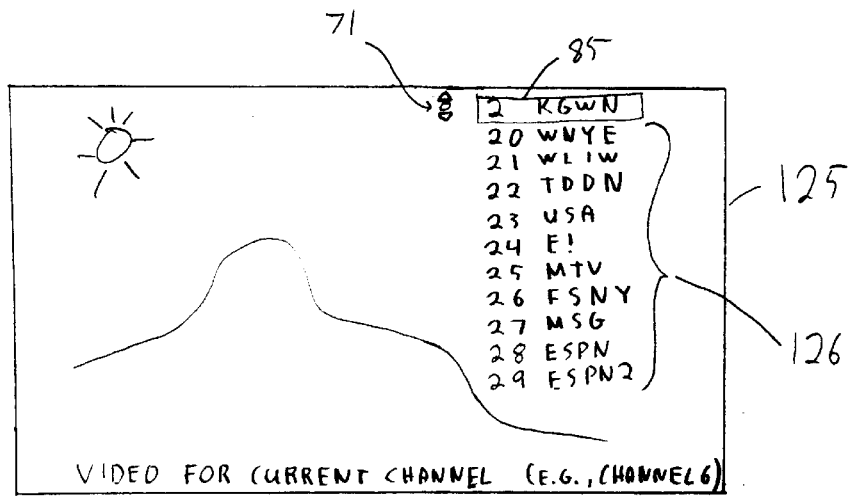
FIGS. 6A–6C are diagrams of illustrative channel number entry screens displaying lists of channels in accordance with the present invention.
Figure 6A:
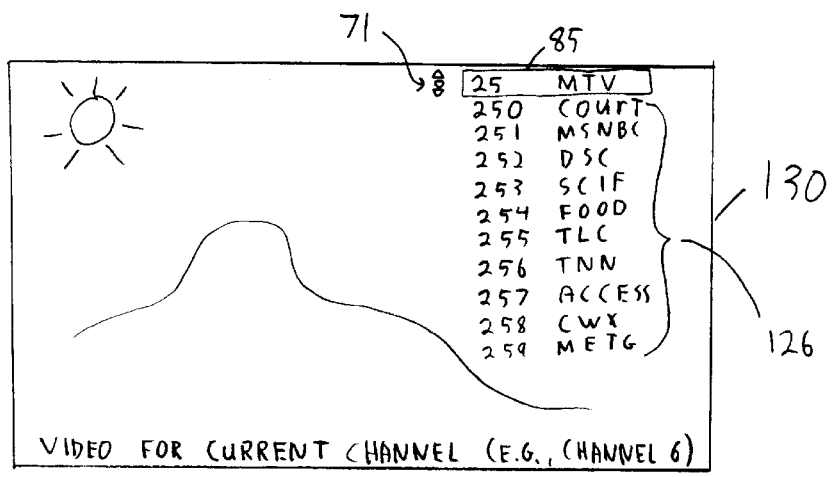
Figure 6A:
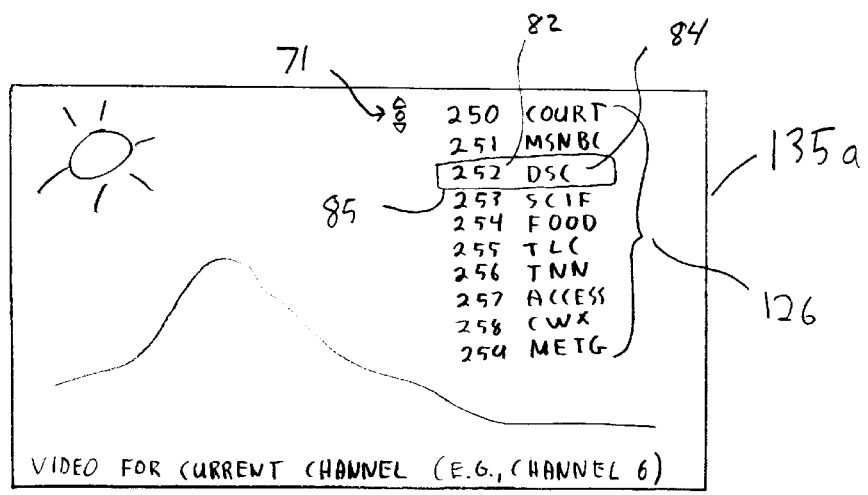
Figure 6B:
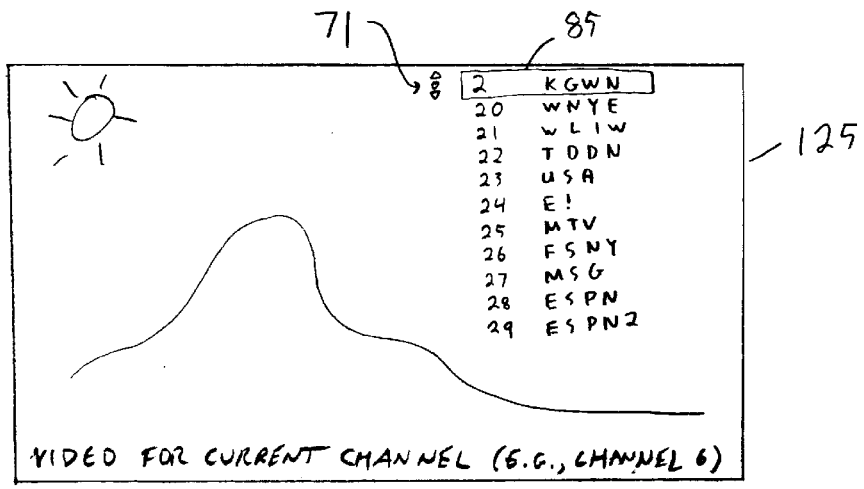
Figure 6B:
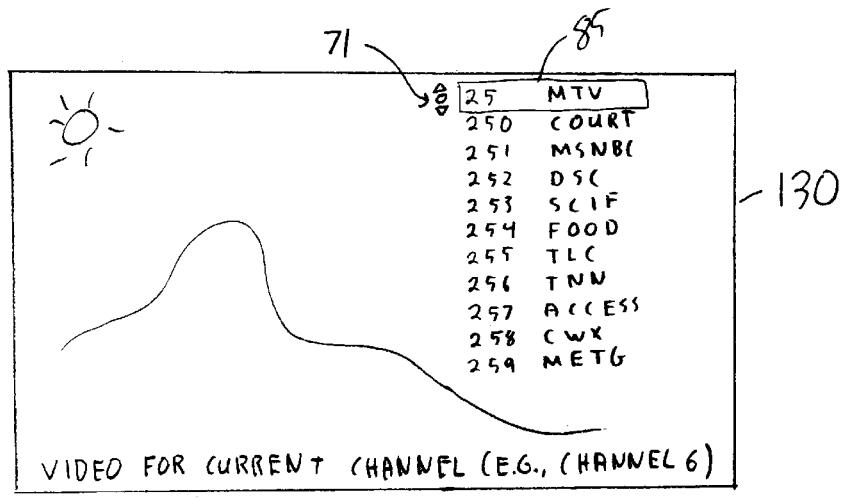
Figure 6B:
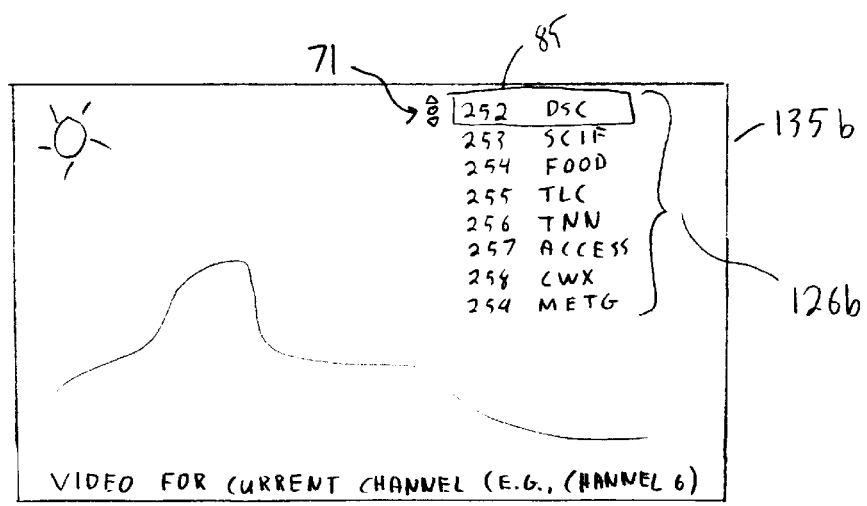
Figure 6C:
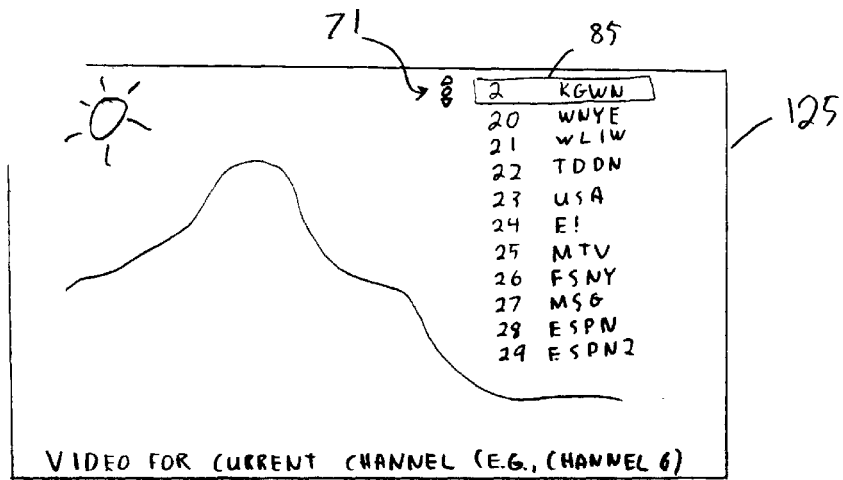
Figure 6C:
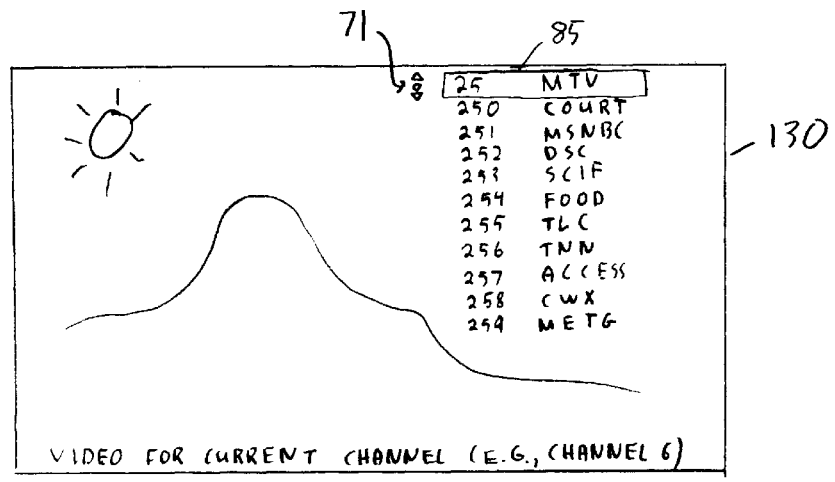
Figure 6C:
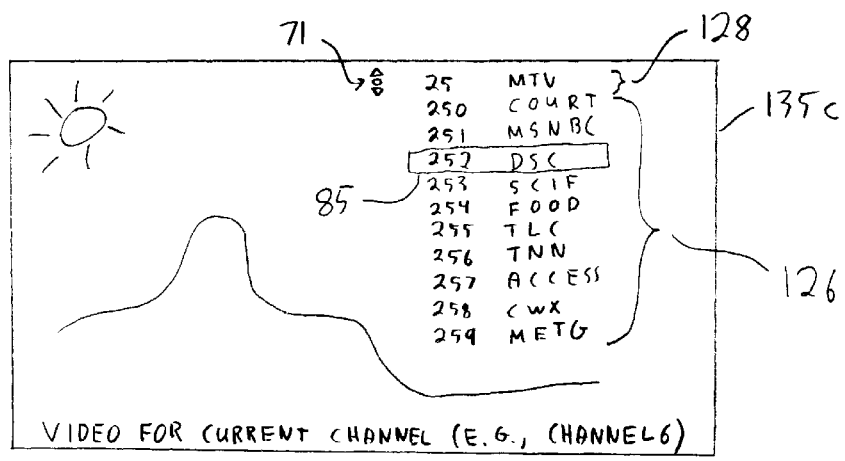

FIGS. 6A–6C illustrate various different ways in which the system may handle the channel number entry process of FIG. 5. If a user desires to tune to channel 252, for example, the user may first press the "2" key. In response, the system may display a screen such as screens 125 shown in FIGS. 6A–6C. Each screen 125 may include graphic 71, highlight region 85, and channel list 126. Each screen 125 may differ from screen 80 of FIG. 3, because screen 125 may include channel list 126. Channel list 126 may be sorted numerically and may contain channels 20–29, which are numerically the first ten channels that begin with the entered digit "2" while not including the entered digit "2". Ten channels is an illustrative number of channels to display in list 126. Any suitable number of channels may be included in list 126 if desired.

After the user presses "2", the user may press the "5" key. In response, the system may display screens 130 as shown in FIGS. 6A–6C. Screens 130 may also contain graphic 71, highlight region 85, and channel list 126. Channel list 126 in screens 130 contains channels 250–259, which are numerically the first ten channels that begin with the entered digits "25" while not including the entered digits "25".

Channel 252 is the channel to which the user desires to tune. Channel 252 is displayed within list 126 in screens 130. Various alternative arrangements may be used to allow the user to tune to channel 252.

One suitable arrangement is shown in FIG. 6A. From screen 130 in FIG. 6A, the user may press the "2" key which may result in the displaying of screen 135a. Screen 135a contains graphic 71 and list 126 as shown in screen 130. Channel number 82 for the entered digits "252" and its associated program listings information 84 are highlighted by highlight region 85 within list 126. A reason why list 126 of screen 135a is the same as list 126 of screens 130 is that channel 999 is the maximum available channel (in this example). There are therefore no available channels that numerically begin with 252 besides channel 252, so list 126 may not change. In order for the system to tune to channel 252, the user may wait for a certain amount of time or may press an "OK" key.

Another suitable arrangement is one in which the system allows the user to tune to channel number 252 as shown in FIG. 6B. From screen 130 of FIG. 6B, the user may press the "2" key, which may result in the displaying of screen 135b. Screen 135b contains graphic 71, region 82, and truncated list 126b. Truncated list 126b may contain fewer channel numbers than were displayed in the list of screen 130. Channel number 82 and its associated program listings information 84 are within highlight region 85. Highlight region 85 of FIG. 6B may be displayed in generally the same location as it was in screen 130 of FIG. 6B to provide the user with a feeling of continuity between screens. In order for the system to tune to channel 252, the user may wait for a certain amount of time or may press an "OK" key.

Another suitable arrangement is one in which the system allows the user to navigate the highlight to channel number 252 as shown in FIG. 6C. The user may press the down arrow three times after screen 130 of FIG. 6C is displayed to move the highlight region 85 from entered channel "25" to desired channel 252 number by number. This may result in a screen layout such as the layout of screen 135c. Screen 135c may contain graphic 71, region 85, list 126, and entered channel information 128. Channel information 128 may include channel number 82 of the entered digits and associated program listings information 84. Channel information 128 may remain displayed because the user is navigating highlighted region 85 through the displayed channel numbers. In order for the system to tune to channel 252, the user may wait for a certain amount of time (after which the system tunes to the highlighted channel) or may press an "OK" key to tune immediately to the highlighted channel.

In each of the arrangements of FIGS. 6A–6C, the system may display a screen such as screen 110 of FIG. 4 when the system tunes to channel 252.

Figure 7:
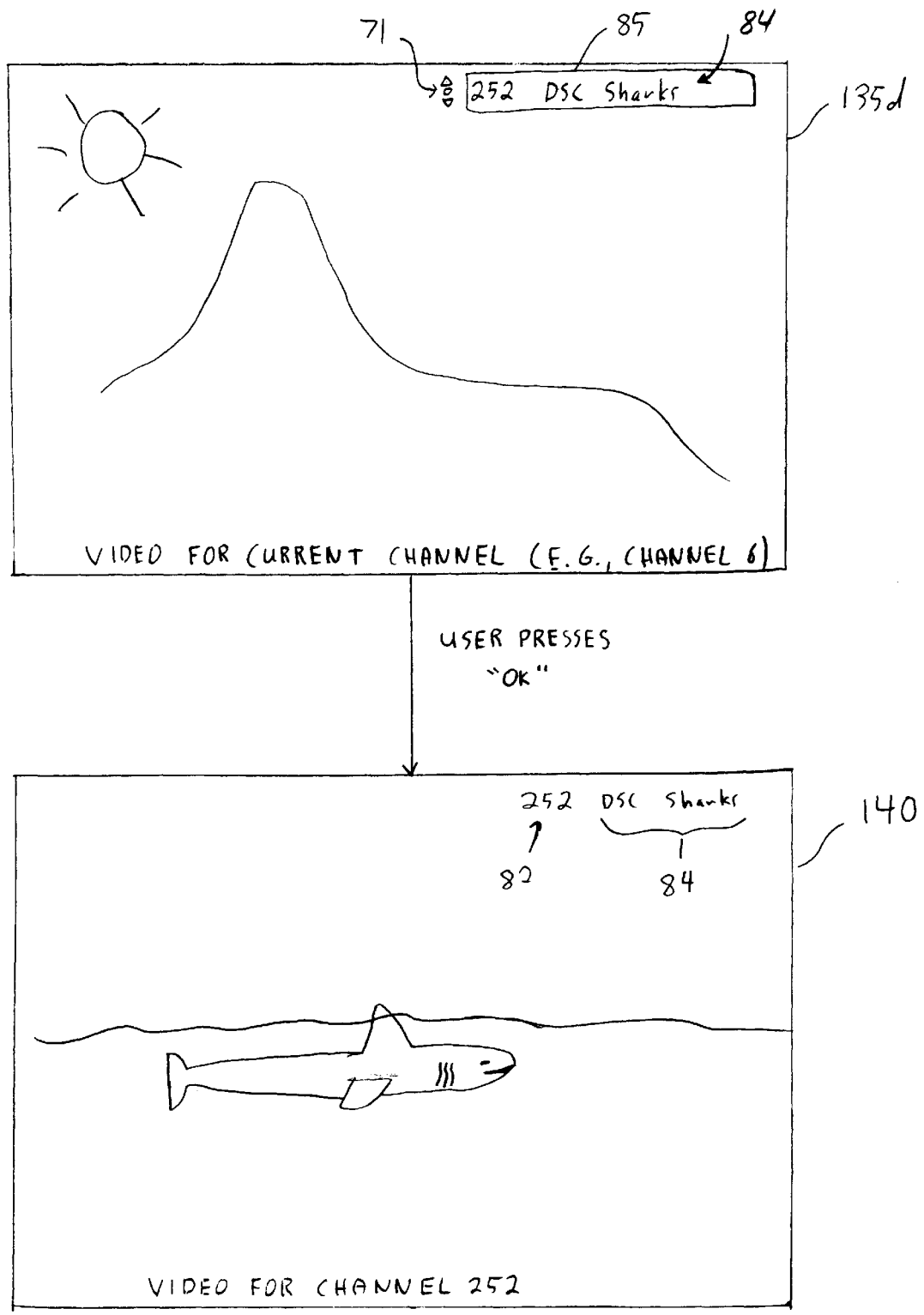
FIG. 7 is a diagram of illustrative channel number entry screens in accordance with the present invention.

FIG. 7 illustrates another suitable arrangement for supporting the channel entry feature described in connection with the steps of FIG. 5. The displayed program listings information 84 may include both a channel identifier (e.g., DSC) and the title of the program currently airing on the channel (e.g., Sharks.) Screen 135d may be displayed after the user enters the digits "2", "5", and "2". If the system supports a maximum channel number of 999 (or other three-digit limit), a channel list such as list 126 of FIGS. 6A–6C need not be displayed because there are no other available channels associated with entered digits "252". The user may tune to channel 252 by waiting for a certain period of time or by pressing the "OK" key.

Screen 140 may be displayed when the system tunes to channel 252. Screen 140 may (at least initially) display the contents of highlight region 85 of screen 135d, (e.g., channel number 82 and associated program listings information 84.) This information may be removed after a few seconds, so that the user's view of the current television program is not cluttered.

Figure 8:
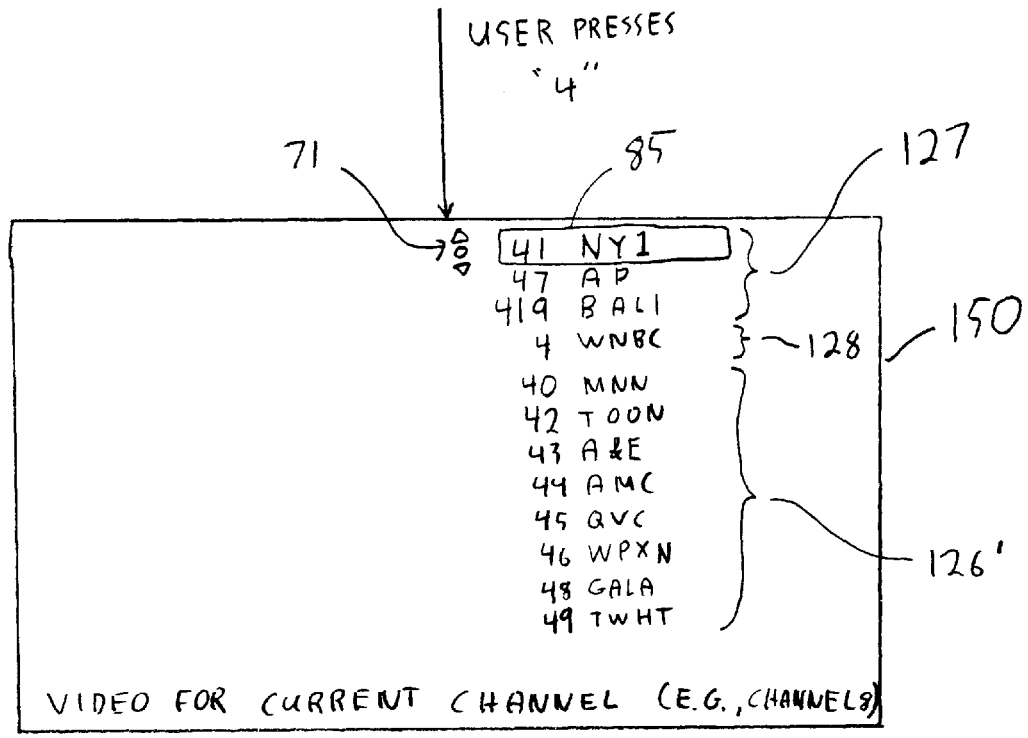
FIG. 8 is a diagram of an illustrative channel number entry screen displaying a list of channels sorted by both favorite channels and numerically in accordance with the present invention.

Another channel entry approach is shown in FIG. 8. Screen 150 may be displayed after the user presses the "4" key. Screen 150 may contain graphic 71, region 85, favorite channel list 127, entered channel information 128, and shortened channel list 126'. The displayed channels are sorted by favorite channels and numerically. The favorite channels associated with entered digit "4" are displayed in favorite channel list 127 and may be sorted numerically. A channel may become a favorite channel by pressing the "FAV" key on remote control 42 when the system is tuned to that channel or by pressing the "FAV" key when that channel is displayed within highlight region 85. Favorite channels may also be selected from a different display screen. The channel number of the entered digit "4" may be displayed as entered channel information 128. The first ten channel numbers numerically associated with entered digit "4" minus any of those numbers already displayed in favorite channel list 127 may be displayed in shortened channel list 126'.

It will be understood that in any of the illustrated embodiments of the steps shown in FIG. 5, channel list 126 may contain a different number of channels than the illustrative number ten. From any of the screens displayed after a channel number has been directly entered, the user may press the "DELETE" key, which may allow the system to return to the screen displayed before the digit was entered. Displayed program listings information 84 has been shown to include the channel designator or both the channel designator and the program currently airing on the channel. In general, displayed program listings information 84 may include the channel designator (e.g., the call letter, name of channel, network affiliation, etc.), the program airing on the channel, any other information specific to the channel, or a combination of such information.

The various lists of displayed channels associated with the entered digit or digits have been shown to be sorted either numerically or by favorites and numerically. In general, the displayed channel lists may be sorted numerically, by type, by frequency of viewing, by recent use, by favorite channels, or by using any other suitable ordering technique. The channels may also be sorted by any combination of these techniques.

Graphic 71 has been shown in screens 125, 130, and 135a–d as containing up arrow graphic 72, down arrow graphic 74 and "ENTER" or "OK" graphic 75. As described above, graphic 71 may be used to notify a user that navigation key or keys on the user input device 40 may be used to navigate through or select one of the channels available to the user. In these embodiments, the up and down arrows 72 and 74 may be used to move highlight region 85 through the displayed channels numbers. For example, in any one of screens 125, if the user continuously presses up arrow 72, region 85 will move from channel 2 to channel 29, channel 28, etc. and continue to loop through the displayed channels. When a channel to which a user desires to tune is highlighted by region 85, the user may tune to that channel by waiting for a certain period of time or by pressing the "OK" key. An additional arrangement may be one where when region 85 is navigated to the bottom of the displayed channels (e.g. 29) by pressing down arrow 74, the next entering of down arrow 74 may display channel numbers 200–209 in channel list 126. Alternatively, up and down arrows 72 and 74 may be used to scroll up and down through the displayed channels accordingly. For example, if up arrow 72 is pressed for any one of screens 130, each displayed number may move up to the screen position occupied by the number just above it and the lowest number (e.g. 29) on the list may be replace by the next channel number (e.g. 30). Similarly, if down arrow 74 is pressed for any one of screens 130, each displayed number may move down to the next number. Top number 2 may be replaced with either channel number 19, channel number 1 or any other suitable number.

Figure 9:
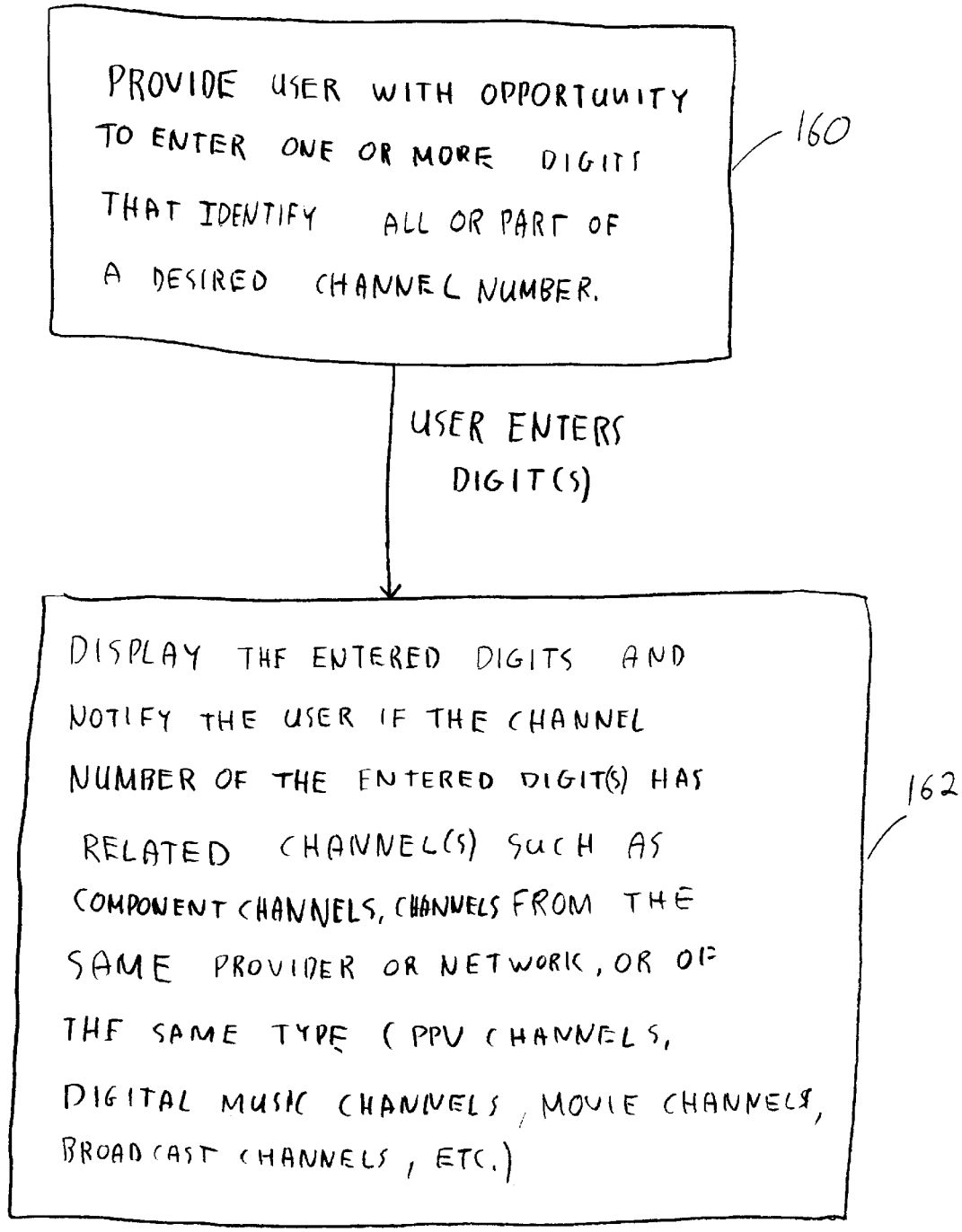
FIG. 9 is a flow chart of steps involved in notifying a user if the entered channel number has related channels in accordance with the present invention.

FIG. 9 shows steps involved in notifying the user of channels that are related to the channel number of the digit or digits that the user has entered. At step 160, the system may provide the user with an opportunity to enter one or more digits that identify all or part of a channel number. At step 162, the system may notify the user if there is a channel or channels related to the channel number of the entered digit or digits. Related channels may include channels that are components of another channel, or channels that are from the same provider or network or of the same type (PPV channels, digital music channels, movie channels, broadcast channels, etc.)

Figure 10:
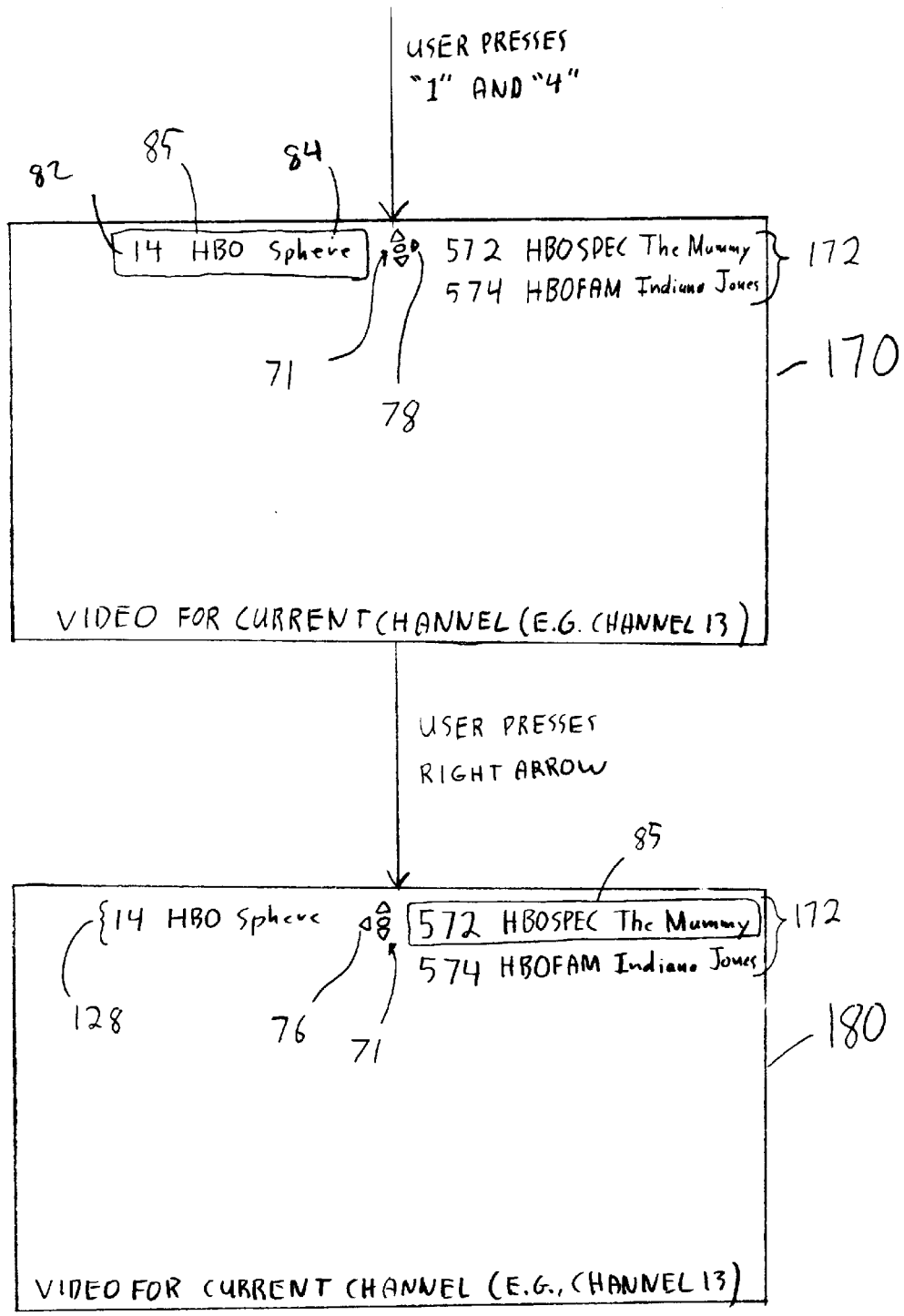
FIG. 10 is a diagram of illustrative channel number entry screens notifying the user of related channels in accordance with the present invention.

One suitable approach for notifying the user when a channel number has a related channel or channels is illustrated in FIG. 10. When a user enters digits "1" and "4", screen 170 may be displayed. Screen 170 may contain region 85, graphic 71, and related channel list 172. These items may be displayed as overlays on top of a television program currently being displayed on display device 50. Region 85 may contain channel number 82 for entered digits "14" and its associated program listing information 84. Graphic 71 may contain right arrow graphic 78, which may notify the user that entered digits "14" have related channels. Related channel list 172 may contain channels related to channel number 82 of the entered digits "14". Channel 14 is shown as HBO and may be related to other HBO channels such as channels 572 and 574. If the user desires to tune to related channel 572, then the user may press right arrow 78. This may result in highlight region 85 moving across into related channel list 172 surrounding displayed channel 572 and its associated program listings information as shown in screen 180. Graphic 71 in screen 180 may contain left arrow graphic 76. Left arrow graphic 76 may notify the user that highlight region 85 may be repositioned on entered digits "14". The user may tune to channel 572 by waiting for a certain period of time (e.g. a second or so) or by pressing the "OK" key.

Component channels may be clusters of channels sponsored by a common entity. There may be one multiplexed channel that contains "main" programming and "minor" programming which may be considered to be one or more component channels of the "main" programming. However, there may be two or more channels where one channel contains the "main" programming and the other channel or channels may contain the "minor" programming which may be component channels of the "main" programming. The component channels may contain different types of content such as audio, video, and high definition television (HDTV) channels.

Figure 11:
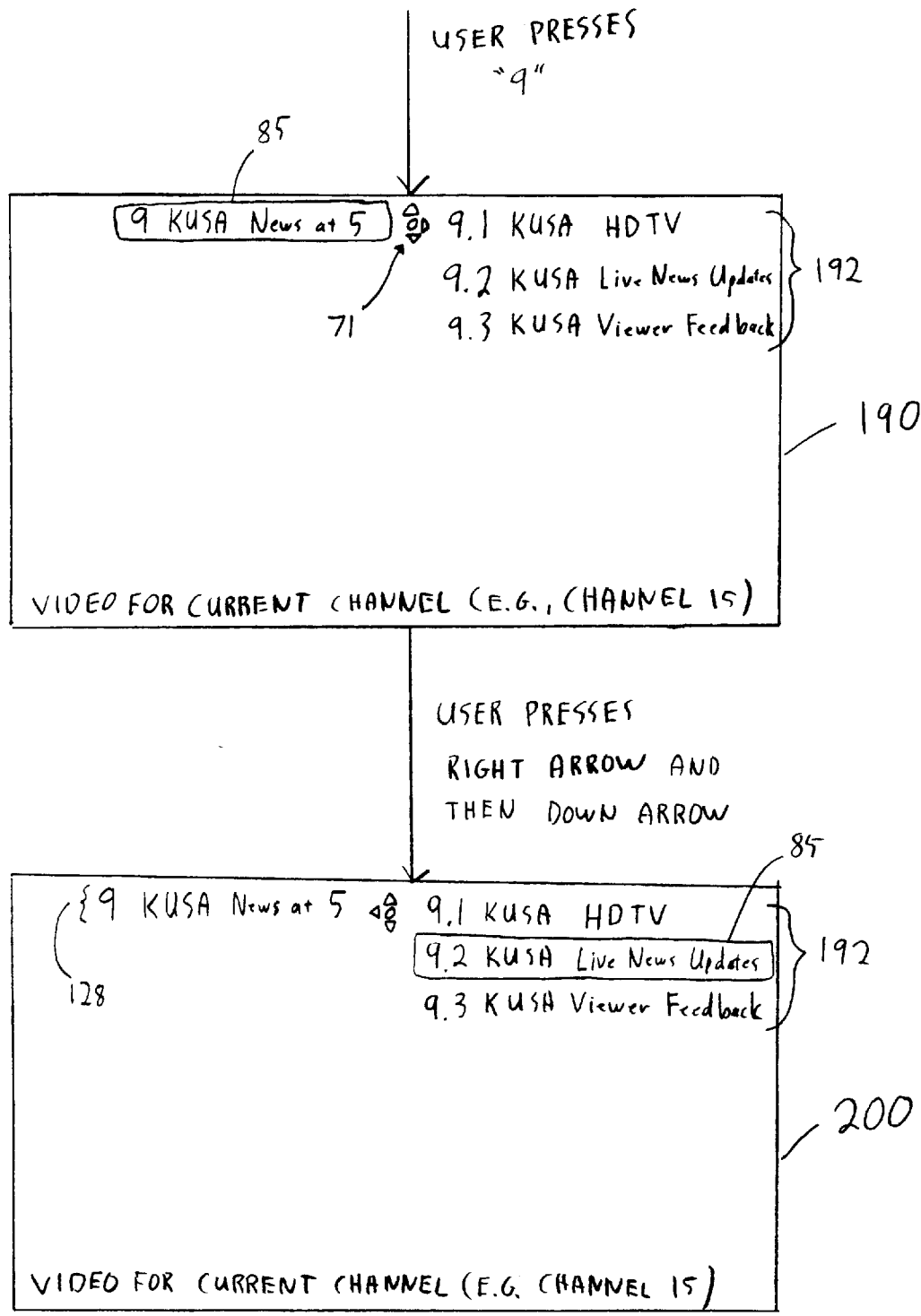
FIG. 11 is a diagram of illustrative channel number entry screens notifying the user of component channels in accordance with the present invention.

Component channels may be handled similarly, as illustrated in FIG. 11. If a user enters the digit "9", screen 190 may be displayed. Screen 190 may contain region 85, graphic 71, and component channel list 192. Region 85 may contain channel number 82 of entered digit "9" and its associated program listing information 84. Graphic 71 may contain right arrow graphic 78 which may notify the user that entered digit "9" has related component channels. Component channel list 192 may contain component channels related to entered digit "9". If the user desires to view the program Live News Updates on component channel 9.2, then the user may press right arrow 78 and then down arrow 74. This may result in region 85 moving across into related channel list 192 and down to surround displayed channel 9.2 and its associated program listings information, as shown in screen 200. The user may then tune to channel 9.2 by waiting for a certain period of time or by pressing the "OK" key.

FIGS. 10 and 11 depict channel entry scenarios where both entered channels have related channels. Not every channel may have related channels. If a channel number is entered that does not have related channels, then displayed graphic 71 preferably does not contain right arrow 78 and related channel lists are preferably not displayed.

Channels may be included in more than one group of related channels. For example, channel 572 which may be related to channel 14 may have related component channels. Therefore, the user may navigate region 85 in screen 170 to channel 572 by pressing right arrow 78 as shown in screen 180. Graphic 71 may contain right arrow graphic 78 to notify the user that channel 572 has related component channels. The user may press right arrow 78 to view the list of channels related to channel 572.

Graphic 71 in FIGS. 10 and 11 includes up arrow graphic 72, down arrow graphic 74 and "OK" OR "ENTER" graphic 75. When region 85 is highlighting a channel in a related channel list such as shown in screen 180 of FIG. 10, the up and down remote control arrow keys may be used to navigate region 85 only through the related channel list. When region 85 is highlighting entered channel number 82, then the up and down arrow keys will preferably navigate through all of the available channels.

The steps shown in FIG. 9 may be used with the steps shown in FIG. 5. The system may then display a list of channels associated with the entered digit or digits and notify the user if the entered digit or digits have related channels.

Figure 12:
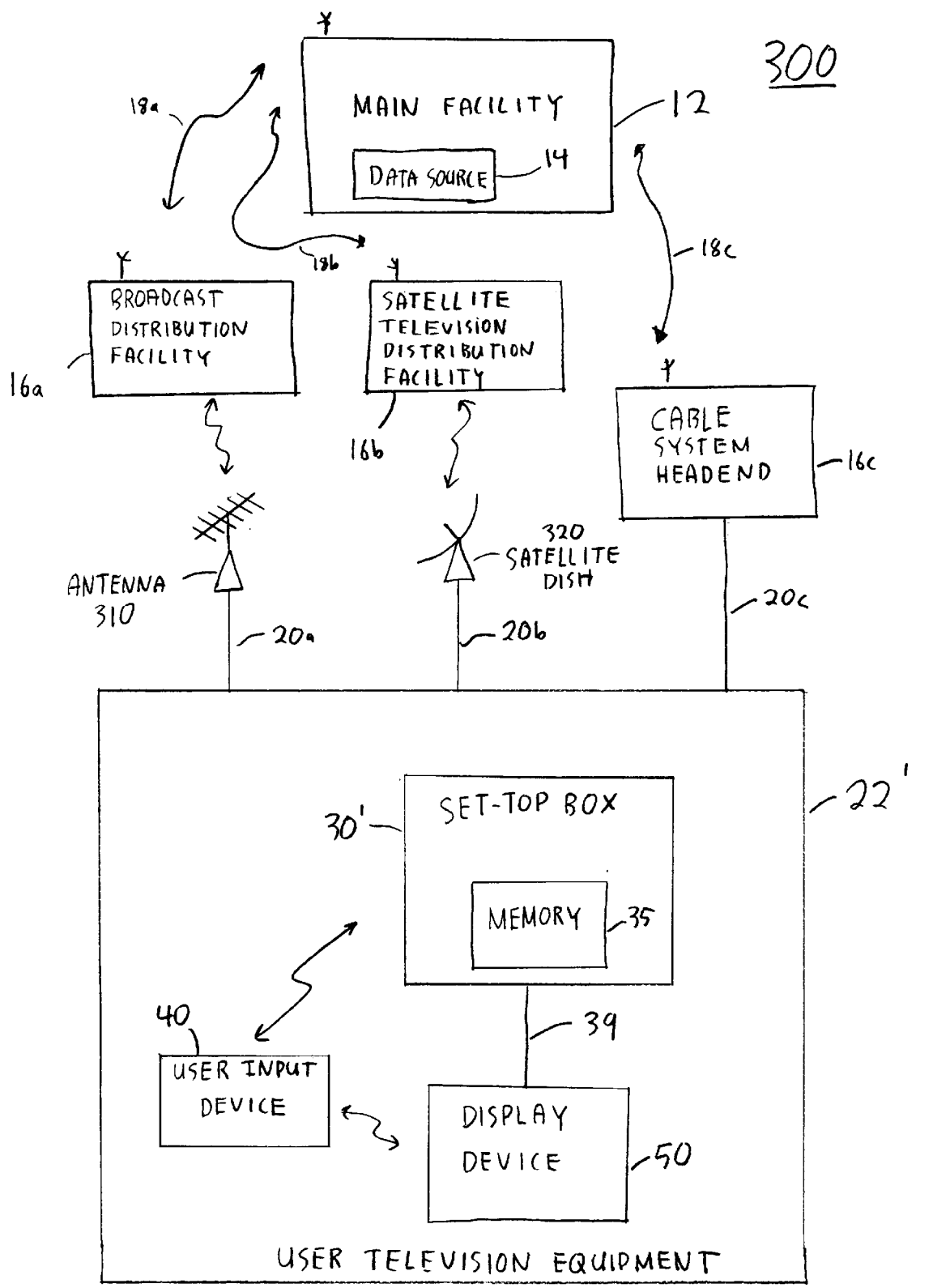
FIG. 12 is a diagram of an alternative system in which an interactive channel entry system is implemented in accordance with the present invention.

An alternative embodiment of a television system is shown in FIG. 12 as system 300. System 300 is similar to system 10 except that user television equipment 22' may receive television programming from more than one source. FIG. 12 shows how user television equipment 22' may receive television programming from broadcast distribution facility 16a, satellite television distribution facility 16b, and cable system 16c which all may receive the television programming from main facility 12 or from several different main facilities. Antenna 310 may be connected to user television equipment 22' via communication path 20a, which may be, for example, a cable or wire. Satellite dish 320 may be connected to user television equipment 22' via communications path 20b, which may be, for example, a cable, wire or fiber optic link. Cable system headend may be connected to user television equipment 22' via communications path 20c, which may be, for example, a cable. Cable system headend 16c may provide user television equipment 22' with two cable lines such as in a dual cable system. Paths 20a, 20b and 20c may also transmit data to user television equipment 22'. Set-top box 30' may provide television programming from antenna 310, satellite dish 320, and cable system headend 16c and display screens to display device 50 using communications path 39. The arrangement of FIG. 12 is described primarily in connection with user television equipment 22' based on a set-top box 30' arrangement for clarity. This is merely illustrative. The interactive channel entry feature may be implemented using user television equipment that is based on a personal computer, a WebTV box, a personal computer television (PC/TV), a handheld computing device, etc.

Figure 13:
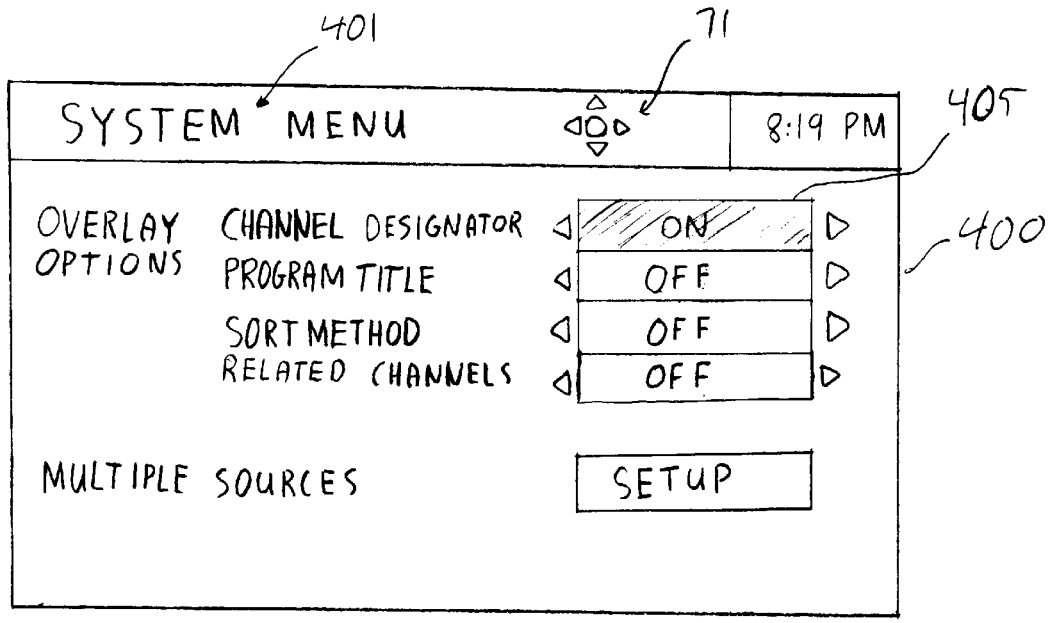
FIG. 13 is a diagram of illustrative menu displays in accordance with the present invention.
Figure 13:
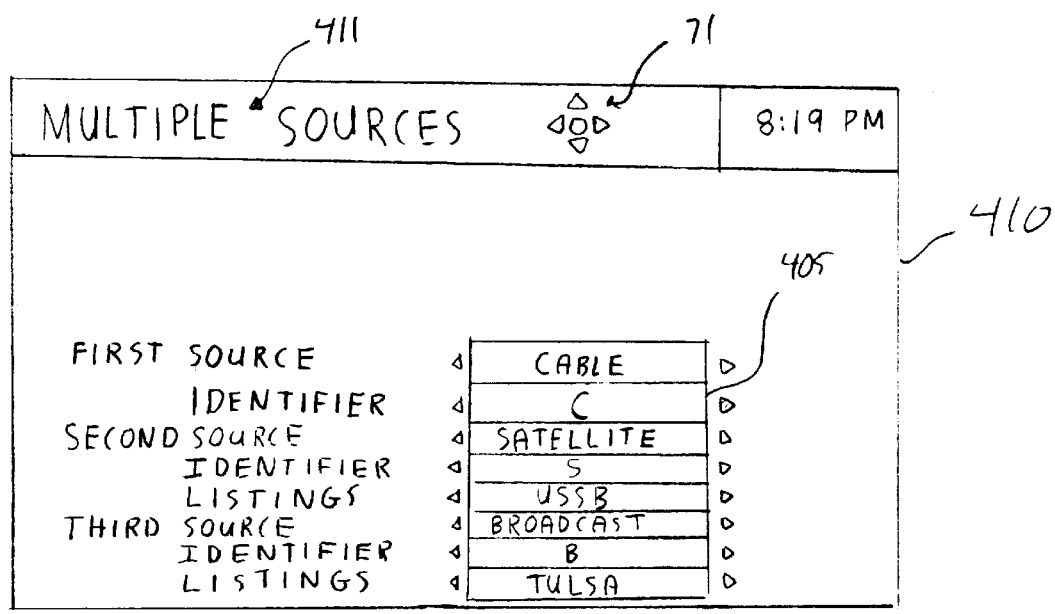

Screen 400 of FIG. 13 displays a system menu 401 that may be used to set up system 300 of FIG. 12. System menu 401 may be accessed by pressing the "menu" key on user input device 40. System menu 401 may contain cursor 405, which may be controlled by navigation keys on user input device 40. Graphic 71 may notify the user of which navigation keys are currently activated at a given time. System menu 401 may allow a user to turn on or off the option of displaying the channel designator, the option of having the program title appear on the entered channel, and the option of displaying related channels during channel entry. System menu 401 may also allow the user to decide whether a channel list is to be displayed during channel entry and if so, how it is to be sorted. For example, if a user prefers to view program titles during channel entry, the user may press the down arrow key once to move cursor 405 down one space and then may press either the left arrow key or the right arrow key to turn ON the program titles from system menu 401.

Multiple sources menu 411 as shown in screen 410 may be reached by pressing the "OK" or "ENTER" key when cursor 405 is on SETUP under multiple sources in system menu 401. Multiple sources menu 411 may allow a user to specify up to and (if desired) more than three different television program sources for system 300. Multiple sources menu 411 may also allow a user to specify a channel identifier to distinguish, for example, channel 11 from a cable source from channel 11 from a broadcast source. As shown in multiple sources menu 411, cable source numbers may have identifier "C" added to their channel number. System 300 may assume that the first source is cable and that is why multiple sources menu 411 in screen 410 may not provide a user with the ability to select listings for the first source. The choice of listings in menu 411 is available because there may be many different sources that the user may connect to system 300 depending on the user's location. If the source does not contain program listings information, the information may be received from television distribution facility 16 or from other distribution facilities as long as the source listing is identified. In another arrangement, the system may automatically assign each source with a source identifier. For example, if cable system headend 16c supplies television programming as in a dual cable system, system 300 may automatically assign a different source identifier to the channels on each cable.

Figure 14:
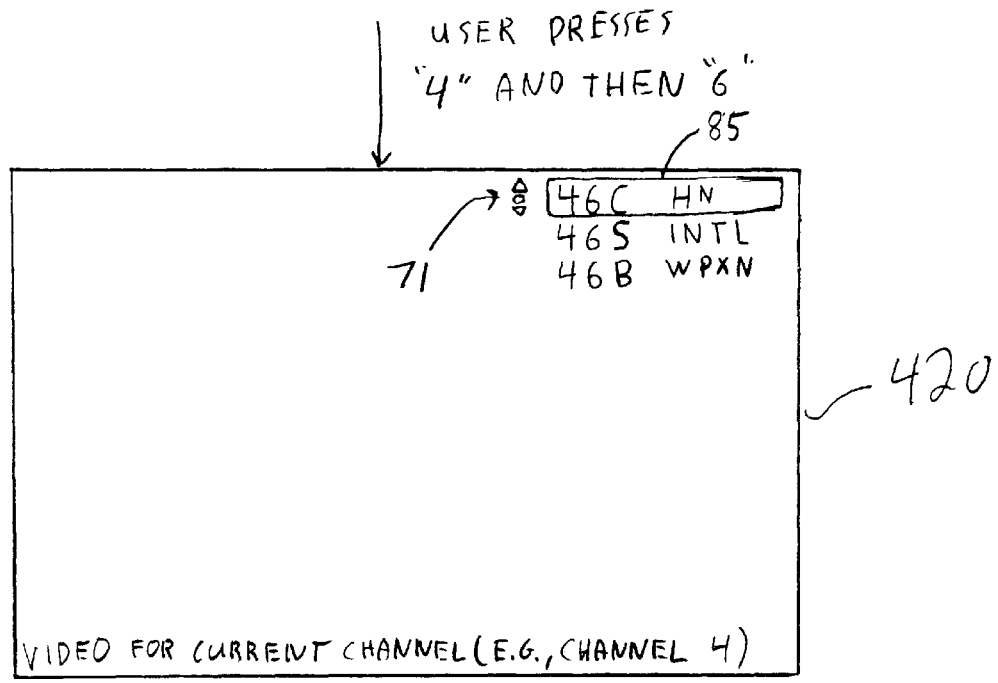
FIG. 14 is a diagram of an illustrative channel number entry screen in which channel numbers are labeled by source in accordance with the present invention.

Screen 420 in FIG. 14 illustrates how source identifiers may be used. For example, if a user desires to tune to satellite channel 46, the user may press the digits "4" and then "6". This may cause the system to display screen 420. Because source identifiers were chosen from menu 411, there is a source identifier displayed adjunct to all three channels 46 that are available to the user. The user should immediately realize that channel 46S is the desired channel. The user may then press down arrow 74 and then the "OK" or "ENTER" key to tune to satellite channel 46. The channel designator of the three channels 46 are displayed in screen 420 because they were set to ON in system menu 401.

It will be understood from system menu 401 that the channel entry technique used for a system with multiple sources may be based on any combination of the foregoing interactive channel selection approaches. Additionally, from screen 420, if a user presses up and down arrow keys, the user may be able to navigate through all of the available channels. In one arrangement, the system may only display channels with the same channel number at any single time while navigating. For example, if the user presses the up arrow key and there is only a cable channel 47, then only that channel will be displayed.

Figure 15:
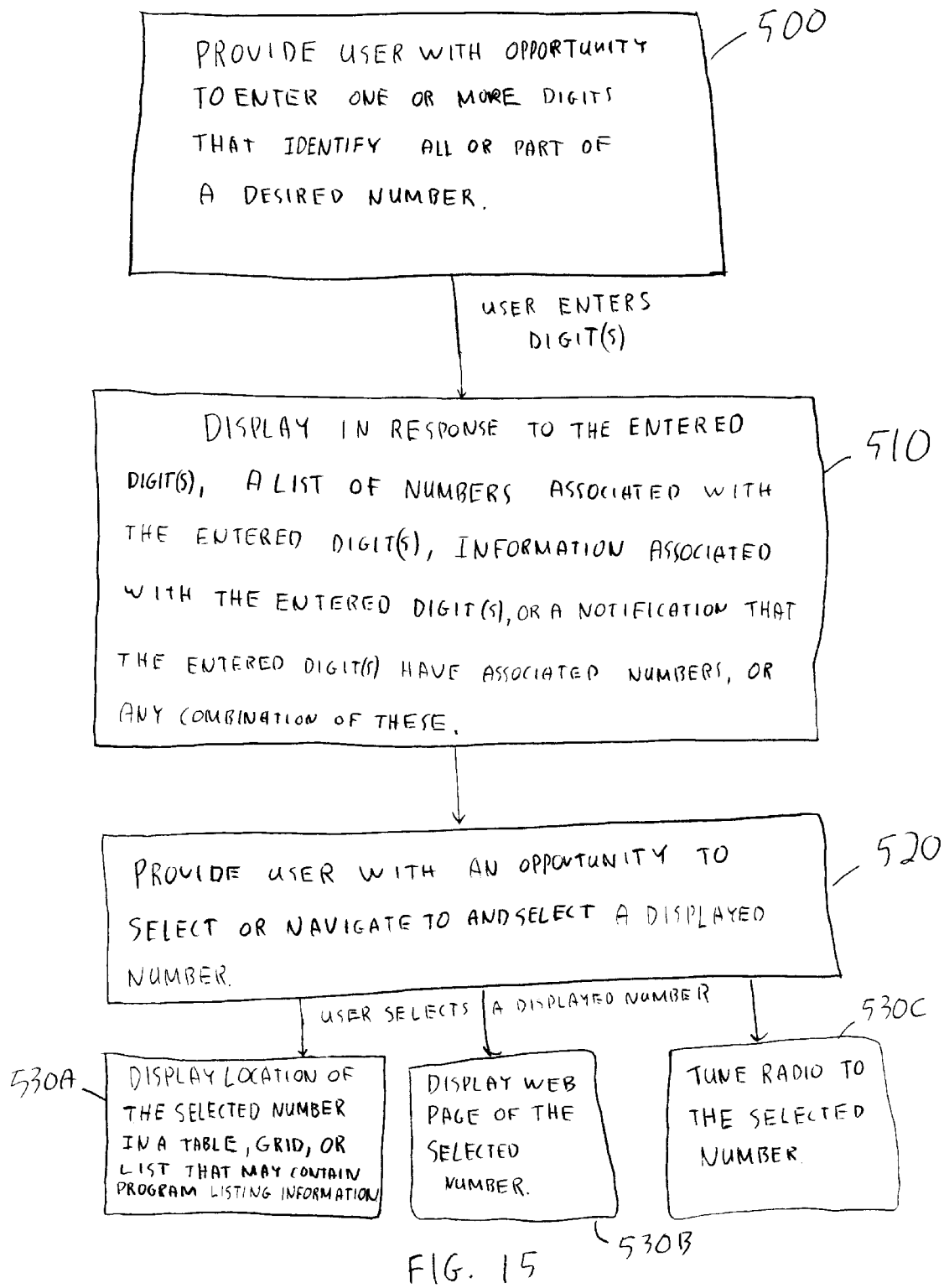
FIG. 15 is a flow chart of steps involved in displaying information in response to entry of a channel number and allowing a user to select a displayed number in accordance with the present invention.

The foregoing interactive channel selection techniques may be used in various other contexts. For example, these channel selection techniques may be used for locating a numbered entry in a table, grid, or list. Interactive television program guides may list channel numbers against times in a table, grid, list, or any other suitable arrangement (hereinafter referred to as a table). Systems 10 and 300 may both be configured to display a program guide table on display device 50. FIG. 15 shows the steps involved in channel number selection when locating an entry in a table. At step 500, the system may provide the user with an opportunity to enter one or more digits that specify all or part of a desired number. At step 510, in response to each entered digit, the system may display a list of numbers associated with the entered digit or digits, information associated with the entered digit or digits, or a notification that the entered digit or digits have related channel numbers or any combination of these. Step 510 may involve displaying any of the types of information and numbers that may be displayed using the arrangements of FIGS. 4, 6A–C, 7, 8, 10, 11, and 14. At step 520, the system may provide the user with an opportunity to select or to navigate to and select a displayed number. At step 530A, the system may display the location of the selected channel number in a table, grid, or list that may contain program listings information.

User television equipment 22 or 22' may be based on a personal computer and communications paths 20 may be an Internet link such as a digital subscriber line (DSL) link, cable modem link, analog modem link, or another other suitable link. The data received over paths 20 may include data in the form of web pages. These arrangements may be used for locating a numbered web page. The steps for locating a numbered web page includes steps 500, 510, and 520 as described above. However, after step 520, when the user selects a displayed number, the system may display the web page for the selected number. For example, the web page may be assigned a "channel" number based on the information displayed on the web page.

The foregoing channel selection arrangements may be used for tuning to a radio station. All radio stations have a number corresponding to their transmitting frequency. Stations may also have call letters and a program schedule. A user may enter numbers into a radio with a user input device. The radio or user input device for the radio may have a display screen. The steps for tuning to a radio station may include steps 500, 510, and 520 as described above. After step 520, when the user selects a displayed channel number, the system may tune to the selected radio station.

Figure 16:
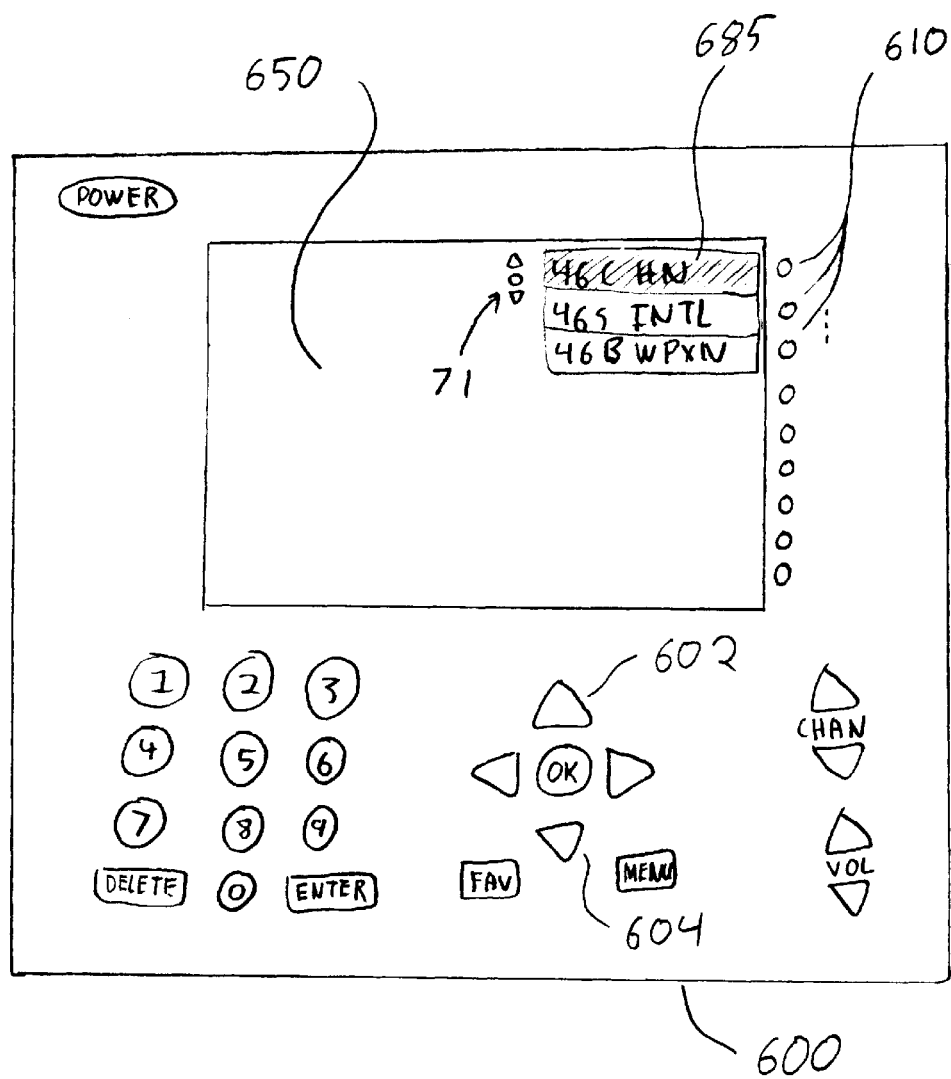
FIG. 16 depicts an alternative remote control that can be used in accordance with the present invention.

FIG. 16 shows an alternative illustrative view of user input device 40 that may be used in any of the foregoing arrangements as remote control 600. Remote control 600 may contain a display screen 650 for displaying display screens from set-top box 30. In addition, display screen 650 may display television programming from set-top box 30. Alternatively, television programming may be displayed on a separate display device such as a television. For example, display screen 650 is shown displaying the overlay shown in screen 420 of FIG. 14. If the user desires to tune to broadcast channel 46B, the user may navigate highlight region 685 to channel 46B with up and down arrow keys 602 and 604 and then wait for a certain period of time or press the "OK" key. Additionally, the user may press the button 610 aligned next to channel number 46B or display screen 650 may be touch sensitive and the user may touch the displayed number 46B to tune to that channel.

One skilled in the art will appreciate that the present invention can be practiced by other than the described embodiments, which are presented for purposes of illustration and not limitation, and the present invention is limited only by the claims which follow.

The invention claimed is:

1. A method for facilitating the selection of a desired channel in a system that has a display device, wherein the desired channel is defined by a multiple-digit number, comprising:

enabling a user to enter a first digit with a user input device;

displaying program listings information associated with a first channel corresponding to the first digit;

enabling the user to enter a second digit with the user input device; and displaying program listings information associated with a second channel corresponding to a second channel number formed by combining the first digit followed by the second digit, wherein the program listings information associated with the second channel is displayed in place of the program listings information associated with the first channel.

2. The method defined in claim 1 wherein the displayed program listings information includes a channel designator.

3. The method defined in claim 1 wherein the displayed program listings information includes a title of a program.

4. The method defined in claim 1 wherein the program listings information is displayed on the user input device.

5. The method defined in claim 1 wherein the desired channel is a television channel.

6. The method defined in claim 1 wherein the desired channel is a Web page.

7. The method defined in claim 1 wherein the desired channel is a radio station.

8. The method defined in claim 1 further comprising:
allowing the user to tune to the desired channel.

9. The method defined in claim 1 further comprising:
allowing the user to numerically navigate from the channel represented by the entered first digit or the entered first and second digits to available channels on the system; and
displaying program listings information in response to each navigation.

10. The method defined in claim 9 wherein the user may navigate through the available channels with up and down keys.

11. A machine-readable medium encoded with machine-readable instructions for facilitating the selection of a desired channel in a system that has a display device, wherein the desired channel is defined by a multiple-digit number, the machine-readable instructions configured to:
enabling a user to enter a first digit with a user input device;
display program listings information associated with a first channel corresponding to the first digit;
enable the user to enter a second digit with the user input device; and
display program listings information associated with a second channel corresponding to a second channel number formed by combining the first digit followed by the second digit, wherein the program listings information associated with the second channel is displayed in place of the program listings information associated with the first channel.

12. The machine-readable medium defined in claim 11 wherein the displayed program listings information includes a channel designator.

13. The machine-readable medium defined in claim 11 wherein the displayed program listings information includes a title of a program.

14. The machine-readable medium defined in claim 11 wherein the program listings information is displayed on the user input device.

15. The machine-readable medium defined in claim 11 wherein the desired channel is a television channel.

16. The machine-readable medium defined in claim 11 wherein the desired channel is a Web page.

17. The machine-readable medium defined in claim 11 wherein the desired channel is a radio station.

18. The machine-readable medium defined in claim 11, the machine-readable instructions further configured to:
allow the user to tune to the desired channel.

19. The machine-readable medium defined in claim 11, the machine-readable instructions further configured to:
allow the user to numerically navigate from the channel represented by the entered first digit or the entered first and second digits to available channels on the system; and
display program listings information in response to each navigation.

20. The machine-readable medium defined in claim 19 wherein the user is allowed to navigate through the available channels with up and down keys.

21. A system that facilitates the selection of a desired channel in a system that has a display device, wherein the desired channel is defined by a multiple-digit number, the system comprising:
means for enabling a user to enter a first digit with a user input device;
means for displaying program listings information associated with a first channel corresponding to the first digit;
means for enabling the user to enter a second digit with the user input device; and
means for displaying program listings information associated with a second channel corresponding to a second channel number formed by combining the first digit followed by the second digit, wherein the program listings information associated with the second channel is displayed in place of the program listings information associated with the first channel.

22. The system defined in claim 21 wherein the displayed program listings information includes a channel designator.

23. The system defined in claim 21 wherein the displayed program listings information includes a title of a program.

24. The system defined in claim 21 wherein the program listings information is displayed on the user input device.

25. The system defined in claim 21 wherein the desired channel is a television channel.

26. The system defined in claim 21 wherein the desired channel is a Web page.

27. The system defined in claim 21 wherein the desired channel is a radio station.

28. The system defined in claim 21 further comprising:
means for allowing the user to tune to the desired channel.

29. The system defined in claim 21 further comprising:
means for allowing the user to numerically navigate from the channel represented by the entered first digit or the entered first and second digits to available channels on the system; and
means for displaying program listings information in response to each navigation.

30. The system defined in claim 29 wherein the user is allowed to navigate through the available channels with up and down keys.

31. The method defined in claim 1 further comprising:
enabling the user to delete the entry of the second digit with the user input device; and
displaying program listings information associated with the first channel corresponding to the first digit, wherein the program listings information associated with the first channel is displayed in place of the program listing information associated with the second channel.

32. The machine-readable medium defined in claim 11, the machine-readable instructions further configured to:
enable the user to delete the entry of the second digit with the user input device; and
display program listings information associated with the first channel corresponding to the first digit, wherein the program listings information associated with the first channel is displayed in place of the program listing information associated with the second channel.

33. The system defined in claim 21 further comprising:
means for enabling the user to delete the entry of the second digit with the user input device; and means for displaying program listings information associated with the first channel corresponding to the first digit, wherein the program listings information associated with the first channel is displayed in place of the program listing information associated with the second channel.

34. A system comprising user equipment that has a display device and facilitates the selection of a desired channel, wherein the desired channel is defined by a multiple-digit number, the user equipment configured to:

enable a user to enter a first digit with a user input device;

display program listings information associated with a first channel corresponding to the first digit;

enable the user to enter a second digit with the user input device; and display program listings information associated with a second channel corresponding to a second channel number formed by combining the first digit followed by the second digit, wherein the program listings information associated with the second channel is displayed in place of the program listings information associated with the first channel.

35. The system as defined in claim 34 wherein the displayed program listings information includes a channel designator.

36. The system as defined in claim 34 wherein the displayed program listings information includes a title of a program.

37. The system as defined in claim 34 wherein the program listings information is displayed on the user input device.

38. The system as defined in claim 34 wherein the desired channel is a television channel.

39. The system as defined in claim 34 wherein the desired channel is a Web page.

40. The system as defined in claim 34 wherein the desired channel is a radio station.

41. The system as defined in claim 34 wherein the user equipment is further configured to:

allow the user to tune to the desired channel.

42. The system as defined in claim 34 wherein the user equipment is further configured to:

allow the user to numerically navigate from the channel represented by the entered first digit or the entered first and second digits to available channels on the system; and display program listings information in response to each navigation.

43. The system as defined in claim 42 wherein the user is allowed to navigate through the available channels with up and down keys.

44. The system as defined in claim 34 wherein the user equipment is further configured to:

enable the user to delete the entry of the second digit with the user input device; and display program listings information associated with the first channel corresponding to the first digit, wherein the program listings information associated with the first channel is displayed in place of the program listing information associated with the second channel.

* * * * *